United States Patent [19]

Maloberti

[11] Patent Number: 4,902,046
[45] Date of Patent: Feb. 20, 1990

[54] CONNECTOR WITH QUICK RELEASE UNDER LOAD

[75] Inventor: René Maloberti, Nogent, France

[73] Assignee: Coflexip, Paris, France

[21] Appl. No.: 73,656

[22] Filed: Jul. 15, 1987

[30] Foreign Application Priority Data

Jul. 16, 1986 [FR] France .................................. 86 10352

[51] Int. Cl.⁴ ............................................. F16L 35/05
[52] U.S. Cl. ......................................... 285/34; 285/363; 285/367; 285/420; 285/920; 411/433
[58] Field of Search ................ 285/2, 33, 34, 35, 920, 285/363, 405, 18, 367, 420; 411/433, 434

[56] References Cited

U.S. PATENT DOCUMENTS

| | | | |
|---|---|---|---|
| 1,062,000 | 5/1913 | Hahn | 411/433 |
| 2,165,656 | 7/1939 | Ryan | 285/2 X |
| 2,421,807 | 6/1947 | Richey et al. | 411/433 X |
| 2,705,652 | 4/1955 | Kasier . | |
| 2,748,647 | 6/1956 | Notturno . | |
| 2,809,584 | 10/1957 | Smith | 285/2 X |
| 3,109,216 | 11/1963 | Brown | 285/2 X |
| 3,120,149 | 2/1964 | Dickie | 411/433 |
| 3,204,515 | 9/1965 | Dickie et al. | 411/434 |
| 3,334,536 | 6/1967 | Armstrong | 285/34 X |
| 3,659,877 | 5/1972 | Kubasta . | |
| 3,926,090 | 12/1975 | Bunker . | |
| 4,082,468 | 4/1978 | von Base . | |
| 4,159,132 | 6/1979 | Hitz . | |
| 4,347,715 | 9/1982 | Carman | 285/2 X |
| 4,424,988 | 1/1984 | Cowx | 285/2 |
| 4,688,827 | 8/1987 | Bassett | 285/2 |

FOREIGN PATENT DOCUMENTS

| | | |
|---|---|---|
| 0080136 | of 1983 | European Pat. Off. . |
| 1184157 | of 1964 | Fed. Rep. of Germany . |
| 2333040 | of 1975 | Fed. Rep. of Germany . |
| 1332745 | of 1963 | France . |
| 4534329 | 9/1965 | Japan .................................. 411/433 |
| 2051993 | 1/1981 | United Kingdom ..................... 285/2 |

OTHER PUBLICATIONS

French Search Report No. FR 86 10 352/FA 381 365, Mar. 30, 1987.

Primary Examiner—Dave W. Arola
Attorney, Agent, or Firm—Hoffman, Wasson, Fallow & Gitler

[57] ABSTRACT

Connector for quick release under load, particularly for pipes for transporting fluids such as hydrocarbons, characterized by the fact that it comprises, between two opposite structural elements (1, 2) or between two parts of an element connecting the two structural elements, at least a connecting device comprises an internally shaped annular ring (7) consisting of at least two segments of complementary shape, a rod (4) equipped with an outside shaping corresponding to the inside of the ring, engaged internally in said ring and extending over at least a part of its height and an annular sleeve (6) engaged on said nut and able to be moved axially in relation to it under the effect of an actuating element, such as a cylinder (12) acting directly or indirectly on said sleeve.

12 Claims, 6 Drawing Sheets

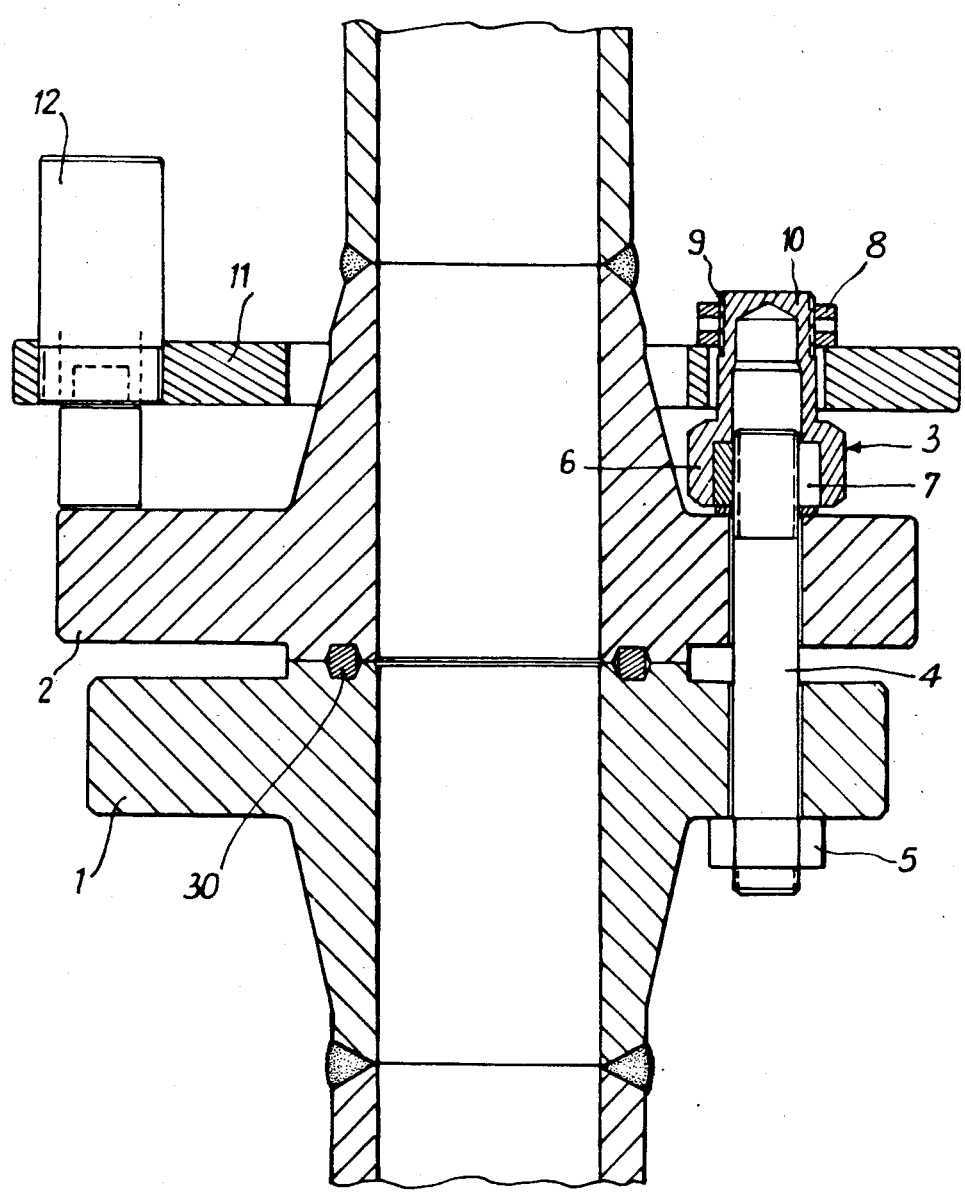
Fig:1

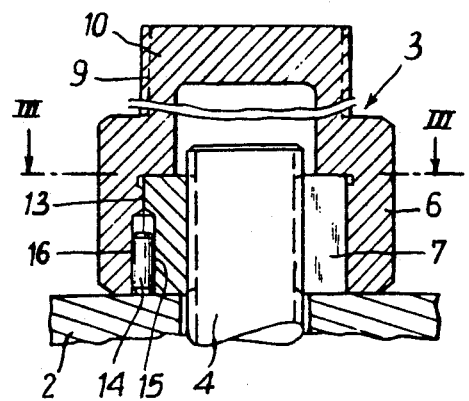
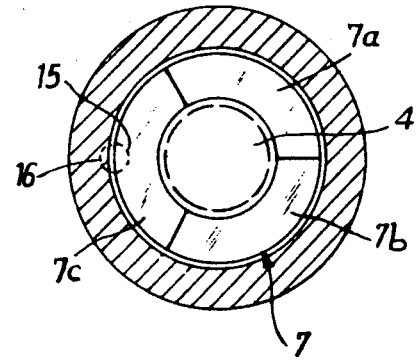
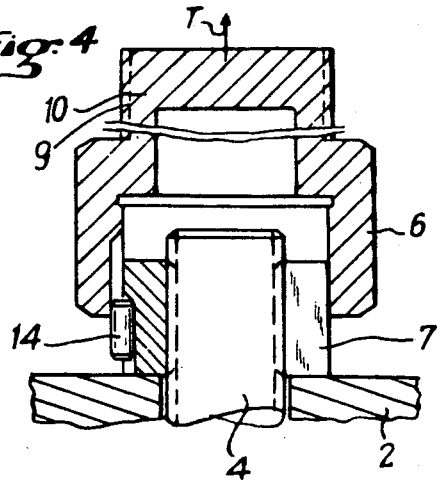
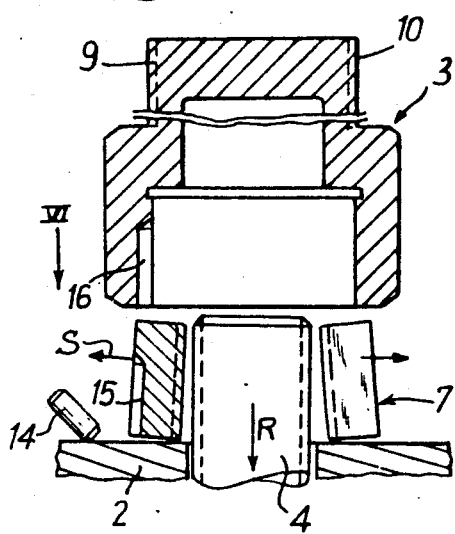
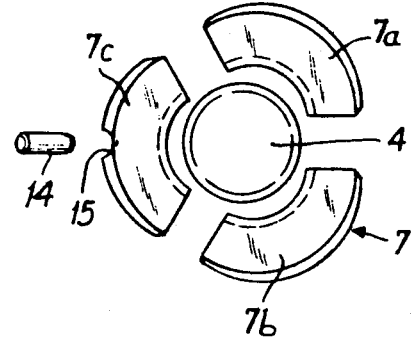

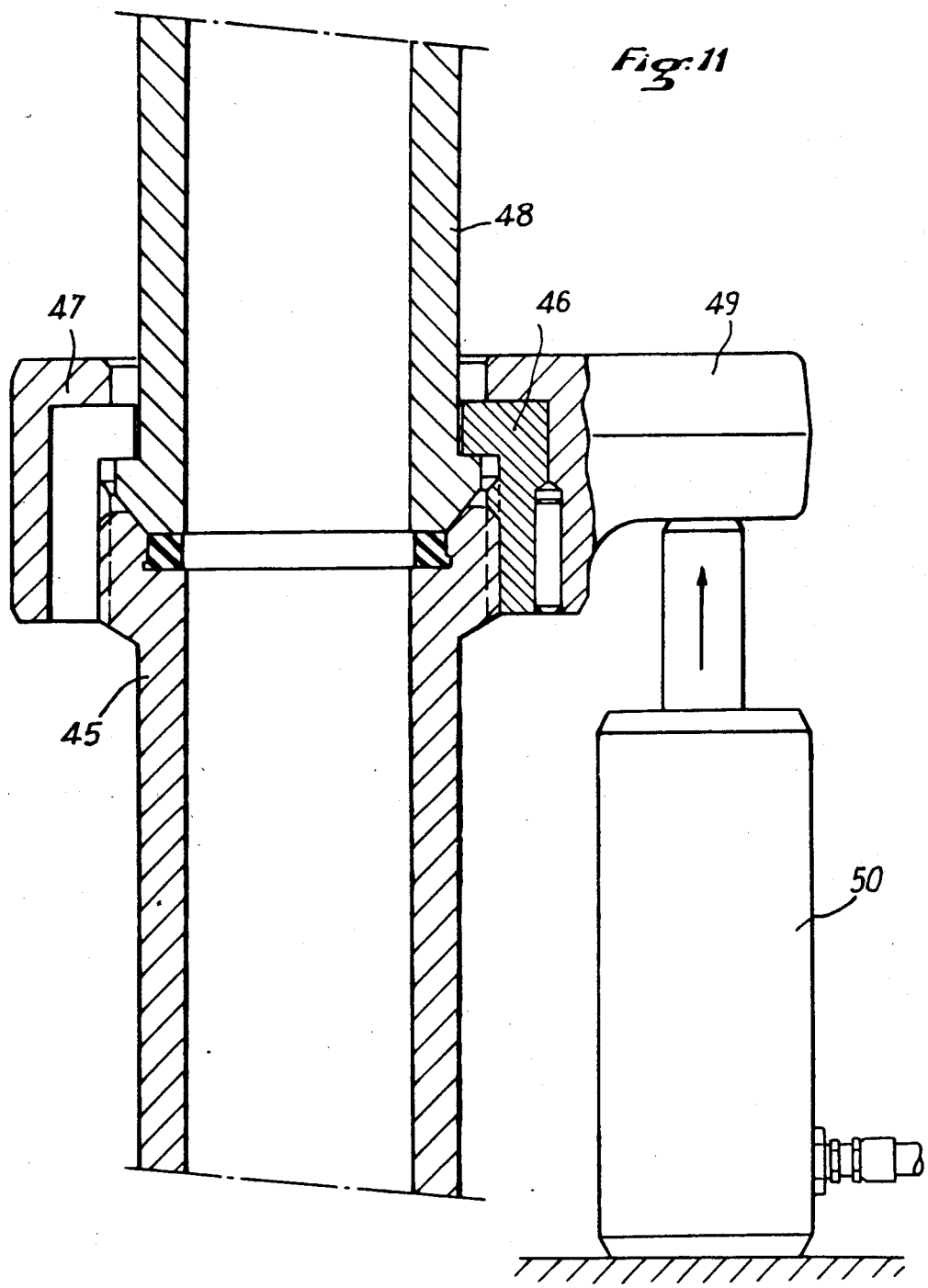

CONNECTOR WITH QUICK RELEASE UNDER LOAD

BACKGROUND OF THE INVENTION

This invention relates to a safety connector with quick release under load of structural elements such as tubular pipes for transporting products dangerous to the environment, particularly hydrocarbons.

The connector according to the invention can be used in all applications where it is necessary to be able to separate, in an almost instantaneous manner, connected structural elements under heavy load, in particular tubular pipes for transfer of hydrocarbons, that are kept under tension.

Such a connector can, in particular, be used in the device described in French patent 76 33086 of the applicant company to connect two structures using a flexible tubular pipe kept under tension assuring both the connection between the structures and the transfer of fluid between them.

Below, reference will be made to the structural elements as being tubular pipes, but it should be understood that this definition is in no way limiting and that the invention can also be put into practice with structural elements such as cables or pipe banks.

According to US-A-3,659,877, a connector is known for tubular pipes that comprises between two flanges opposite a plurality of connecting devices each made up of a threaded rod equipped with a reduced section intended to form a rupture zone, the threaded rods each being held by nuts on the corresponding flanges.

Because of the reduction of section of each of the threaded rods, the allowable load of the connector made is reduced and disconnection during an overload is not absolutely reliable to the extent that it is not possible to guarantee a simultaneous sectioning of all the rods providing the connection.

SUMMARY OF THE INVENTION

This invention has as its object to make a quick-release connector that makes it possible to achieve, in a particularly reliable way, a quick disconnection between two structures, even when a very heavy load is applied on the connecting devices, this load according to the invention being able to be close to the breaking load of the elements that make up the constituent elements of the connecting devices, i.e., in practice on the order of several tens of tons.

The connector for quick release under load according to the invention is characterized essentially by the fact that it comprises, located between two opposite structural elements or between two parts of an element connecting the two structural elements, at least one connecting device comprising an internally shaped annular ring and consisting of at least two segments of complementary shape, a rod equipped with an outside shaping corresponding to the inside shaping of the ring, engaged internally in said ring and extending over at least a part of its height and an annular sleeve engaged on said ring and able to be moved axially in relation to it under the effect of an actuating element such as a cylinder acting directly or indirectly on said sleeve.

The shapings made on the rod and the ring are preferably threads, the ring then being a nut in which the threaded rod is screwed internally, if necessary after the sleeve has been engaged on the ring.

As a variant, the shapings can consist of denticulations, in which case the constituent segments of the ring are engaged on the rod, then kept in place thanks to the sleeve.

It is understood that, according to the invention, when an axial force is exerted in a direction tending to separate the sleeve from the rod on which the ring is engaged, the sleeve slides on the periphery of the ring until its end arrives in the vicinity of the end of the ring then causing a separation of the segments that make up this latter.

Preferably, the annular sleeve is shrink-fitted on the ring.

As a variant, it is possible to provide a slight assembly play. The contact surface between the ring and the sleeve is preferably cylindrical but as a variant can be slightly conical in the direction opposite that which would cause the self-shrinking of the sleeve on the ring because of the locking of the ring on the rod.

In a particular embodiment, the ring consists of three equal annular segments. In a particular embodiment using a threaded rod and a nut and intended to be used in the case where it is desired, during positioning, to achieve a locking between the nut and the threaded rod by rotation of the sleeve engaged on the nut, there is provided on the inside wall of the sleeve and the outside wall of at least one of the segments of the nut, at least one groove of semicircular section, a cylindrical pin being housed in the grooves opposite to assure the transmission of a locking torque. This locking torque can, for example, be applied by using a tool that is engaged on a part of the sleeve made, for example, hexagonal.

The device according to the invention can further comprise a second rod that is shaped, threaded or denticulated, engaged in the ring and solid with the structural element with which the sleeve is made solid. Thus, there are two opposite shaped rods engaged in the ring and each solid with a structural element.

In an advantageous embodiment, particularly to reduce the travel of the sleeve before separation from the segments of the ring, the latter exhibits an outside surface in stages comprising at least one set-back, the sleeve exhibiting a corresponding inner surface. Thanks to this embodiment, the separation from the segments of the ring is obtained as soon as the sleeve has traveled a length corresponding to only one part of the length of the ring, namely the distance separating the end of larger diameter of the ring from the zone of the set-back.

In a particular embodiment of the invention, the threaded rod of each connecting device is made solid with an annular flange of a structural element, the sleeve being made solid preferably with a mobile annular plate whose movement under the effect of the actuating element such as a cylinder causes, as indicated above, the necessary movement of the sleeves engaged in the rings having corresponding segments and the desired disconnection.

In another embodiment of the connector according to the invention, there is provided a single connecting device whose shaped rod is threaded and tubular, and constitutes one of the connected pipes. In this case, disconnection is advantageously obtained by movement of the sleeve surrounding the pipes connected under the effect of a cylinder pressing on a flange solid with the sleeve.

BRIEF DESCRIPTION OF THE DRAWINGS

To understand the invention better, particular embodiments will now be described by way of nonlimiting examples with reference to the accompanying drawing in which:

FIG. 1 represents diagrammatically a connector of tubular pipes according to a first embodiment of the invention, FIG. 2 is a diagrammatic view in section of a connecting device of a type that can be used in the connector of FIG. 1, in assembled position, FIG. 3 is a view in section along III—III of FIG. 2, FIGS. 4 and 5 are views similar to figure 2, showing the connecting device during two separation phases, FIG. 6 is a view in the direction of arrow VI of FIG. 5 illustrating the separation of the segments of the nut.

DESCRIPTION OF THE PREFERRED EMBODIMENT

Figure 7:
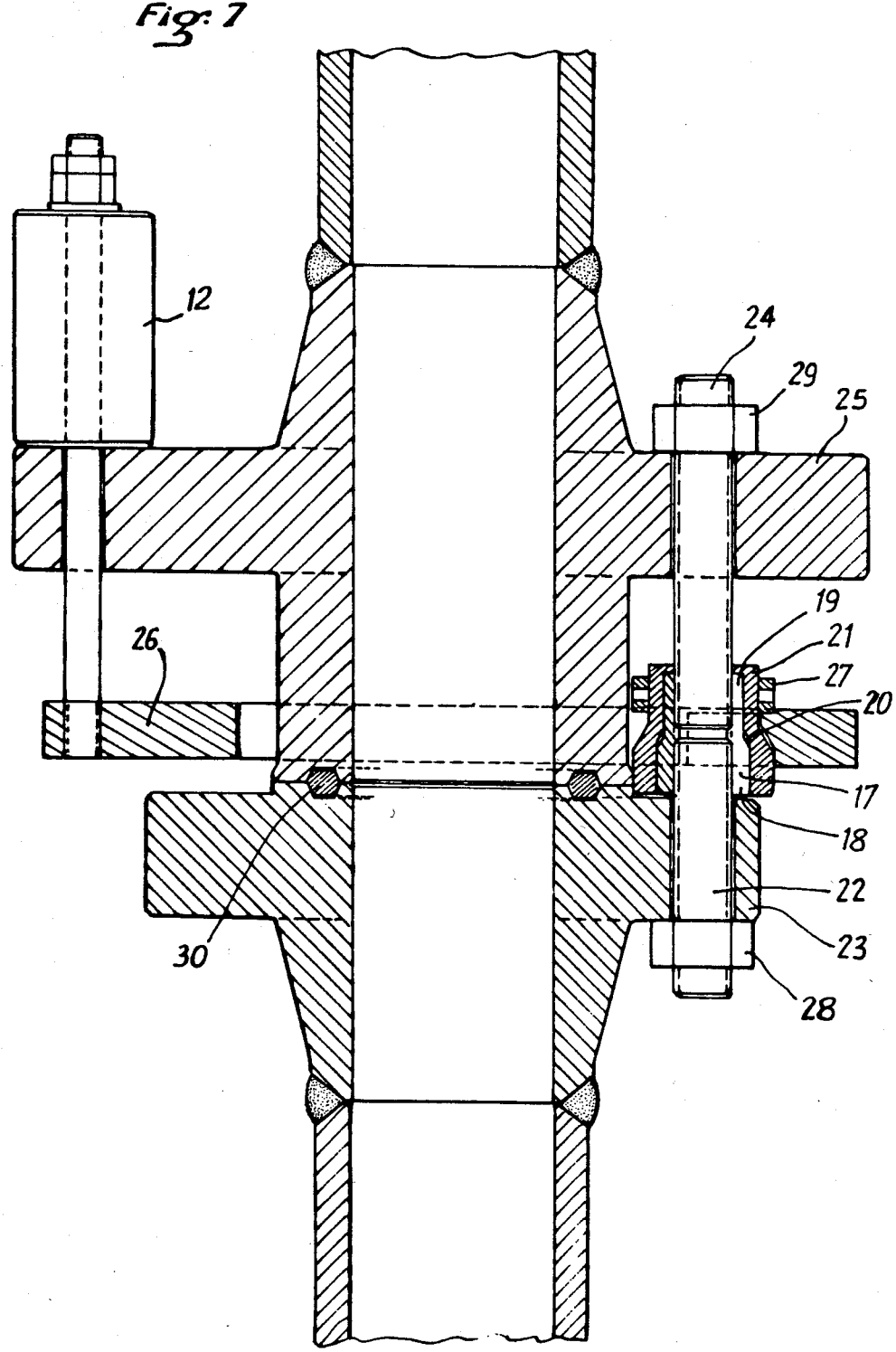
FIG. 7 illustrates a connector of tubular pipes according to a second embodiment.

FIG. 1 illustrates a connector of tubular pipes such as those used for the transport of hydrocarbons and with a vertical axis in the example illustrated.

The connector comprises two annular flanges 1 and 2 between which a quick disconnection under load should be able to be made, a plurality of connecting devices 3 described more in detail with reference to FIGS. 2 to 6 being distributed on said flanges 1 and 2. Each connecting device comprises a shaped rod 4, threaded in the example shown, which goes through flange 1 of the upper connector element and is fastened by a corresponding nut 5 to the flange of the other connector element. The connection is provided by locking of a sleeve 6 engaged around a tapped ring forming nut 7 of each connecting device against flange 2. A nut 8 screwed on a thread 9 of free end 10 of sleeve 6 secures the sleeve of an annular plate 11 mounted coaxially around the upper connector element. A thrust cylinder 12 is provided to lift plate 11 while resting against flange 2. Advantageously several cylinders could be provided.

It is understood that an actuation of cylinder 12 causes a separation between flange 2 and plate 11 and therefore the movement of sleeves 6 of the various connecting devices as illustrated in FIGS. 2 to 6.

In these figures, the operating principle of a connecting device that can be used in the connector according to the invention has been illustrated.

These connecting devices are known in their principle. An application to the disconnection of a covering structure in an offshore drilling platform is, for example, described in the patent US-A-4,082,468. In this document, it is a matter of being able to perform an easy disconnection by divers but not as in this invention a disconnection as quick as possible under heavy load.

The connecting device according to the invention comprises an annular ring 7, with an outside cylindrical surface, but which could be slightly conical, and which, in the example shown, consists of assembly of three equal complementary segments 7a, 7b, 7c.

On ring 7, in which the end of a threaded rod 2 is engaged here by screwing, a sleeve designated overall by 6 is engaged with an interference fit. This sleeve 6 comprises a lower part exhibiting a lower bearing surface 13 applied on the periphery of ring 7, and a part of free upper end 10 exhibiting, for example, a threaded outside section 9 and on which can be engaged a nut 8 (FIG. 1) holding sleeve 6 on a structural element to be separated from the structural element to which threaded rod 4 is fastened.

In the example illustrated with a threaded rod and a nut, there is provided a cylindrical pin 14 housed in grooves 15 and 16 of semicircular section of inside wall 13 of the sleeve and of the outside wall of segment 7c of the nut. This cylindrical pin is intended to facilitate the transmission of a locking torque to the nut after shrink-fitting thereon of the sleeve by application of a tool such as a wrench on the nut.

When, as illustrated in FIG. 4, a pull is exerted in the direction indicated by arrow T, there are performed an unshrinking and a movement of sleeve 6 in relation to nut 7 which remains solid with threaded rod 4. When the position illustrated in FIG. 5 is reached, the segments of nut 7 are no longer held on the inside of the recess of sleeve 6, which permits their separation as diagrammed by arrow S in FIG. 4 and a separation of nut 7 from rod 4 which, no longer being held, separates in the direction of arrow R illustrated in FIG. 4.

The connector illustrated in FIG. 7 differs from the one illustrated in FIG. 6 particularly by the fact that each of rings 17 of the connecting devices exhibits an outside surface stepped with a lower part of larger outside diameter 18 and an upper part of reduced outside diameter 19, a set-back 20 thus being made between the two parts. Shrink-fitted sleeve 21 exhibits an inside section shape suited to that of ring 17.

A shaped rod 22, here threaded, solid with a flange 23 is screwed into the ring, here a nut 17, on a part of its length, approximately up to set-back zone 20, while an upper shaped rod 24, here threaded, solid with a flange 25 is screwed into nut 17 until coming approximately opposite the end of rod 22. In this example also, nut 17 is made in three complementary segments. Sleeve 21 is made solid with an annular plate 26 by a nut 27 similar to nut 13 of the preceding embodiment. Also, nuts 28 and 29 make threaded rods 22 and 24 solid with flanges 23 and 25. As in the embodiment of FIG. 1, a seal 30 is provided between the two connector elements.

It is understood that by bringing together plate 26 of flange 25 under the effect of cylinder 12, sleeve 21 is lifted by nut 27 slides in relation to nut 17 until its lower end comes into the set-back zone of the outside surface of the nut causing a separation of the segments that make up the nut.

This embodiment makes possible a quick disconnection under heavy load in the case where the load is highly deflected in relation to the longitudinal axis of the connection.

Figure 8:
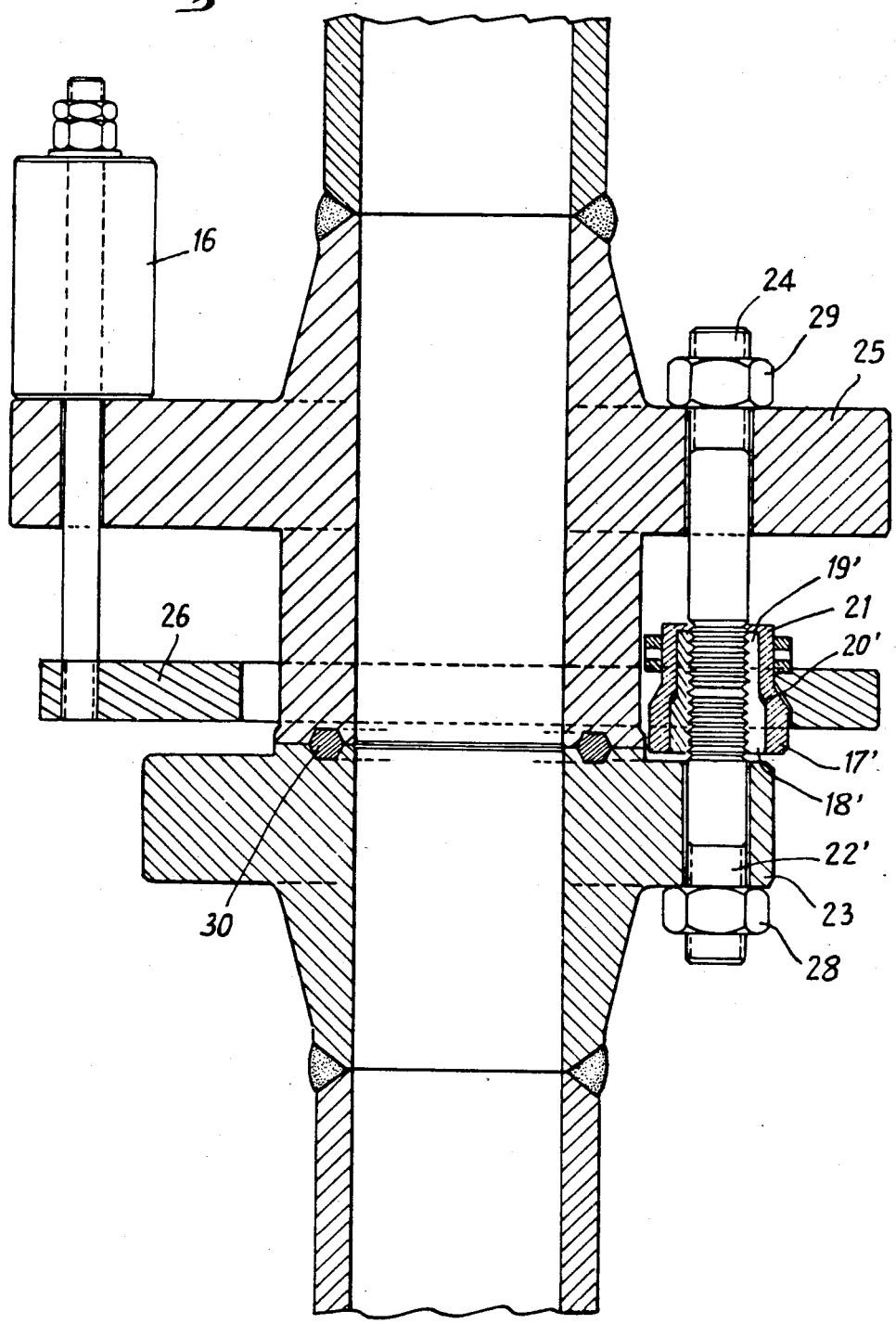
FIG. 8 illustrates a variant of this connector.

The embodiment of FIG. 8 differs from that of FIG. 7 by the fact that each threaded rod 22' and 24' no longer comprises a threading but a denticulation that is, a series of annular ridges or ribs, ring 17' being internally denticulated in a corresponding way. The tops and bottoms of the teeth are located in parallel planes orthogonal to the axis of the rings and rods.

Such a shaping in the form of denticulation can, of course, be used for rod 4 and ring 7 of the embodiment of FIG. 1. The term "serrations as used in the claims below is intended to cover both helical threads and annular denticulations.

Figure 9:
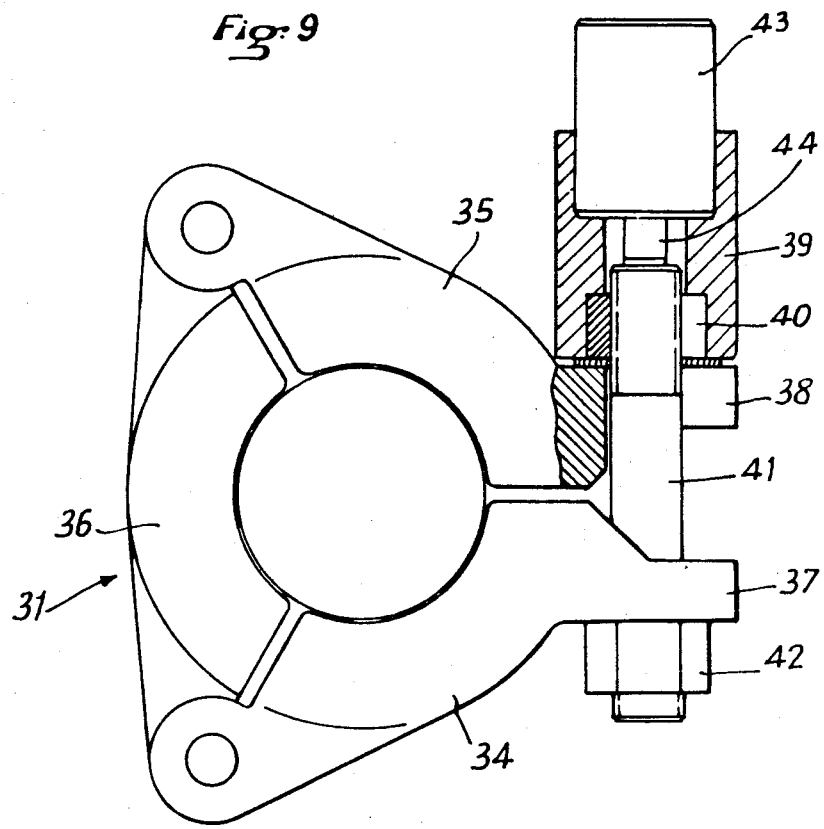
FIGS. 9 and 10 are views respectively in cross section and in elevation of another connector embodiment according to the invention, FIG. 11 further illustrates another connector embodiment of tubular pipes.
Figure 10:
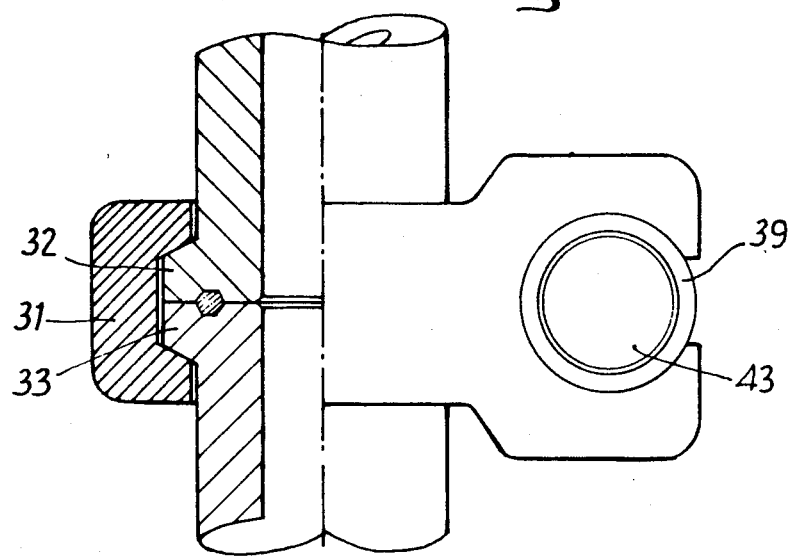

In the embodiment of FIGS. 9 and 10, there is provided an annular element in the shape of a stirrup 31 connecting two flanges 32,33 opposite the assembled connector elements. In the example illustrated, the stirrup comprises two parts 34,35 articulated in relation to a part 36, a quick-separation connecting device according to the invention being placed between two opposite flanges 37,38 of parts 34,35. Thus, sleeve 39 is engaged on a nut 40, for example, having three segments inside of which is screwed a threaded rod 41 drawn by a nut 42 against flange 37. The separation of flanges 37,38 and therefore the opening of stirrup 31 and the separation of flanges 32,33 of the connector is assured by a cylinder 43 solid with sleeve 39 and whose rod 44 rests on threaded rod 41.

In the embodiment of FIG. 11, a single connecting device is provided whose tubular threaded rod 45 is one of the connected pipes, a nut 46 surrounded by a sleeve 47, being placed around rod 45 and the other pipe 48.

Sleeve 47 comprises a flange 49 on which the rod of a cylinder 50 rests for disconnection.

According to the invention, particularly simple and reliable connectors can be made that can be separated under the effect of a force that is a great deal less than the load brought about by the tension of corresponding rods, for example 15 to 20 times less than this tension.

Thus, for example, with a threaded rod 2 or 22 of dimension M30 with a nut locking torque of 130 m.daN corresponding to a rod tension of 29 tons, an axial force of 1.7 tons suffices to perform the disconnection.

Although the invention has been described in connection with particular embodiments, it is quite obvious that it is in no way limited to them and that numerous variants and modification can be made to it without thereby going outside its scope or its spirit.

I claim:

1. A connector assembly for joining together ends of two flanged pipes, capable of quickly releasing the pipes even when they are in tension, comprising two flanged pipes having ends
    at least one connecting device for holding said ends in apposition, said device comprising
    an annular retaining ring assembly for engaging one of said flanges comprising at least two separate arcuate segments, each having a serrated internal surface thereon,
    a rod having at one end an outside surface with serrations thereon corresponding to those of the ring, and normally engaged thereby over at least a part of the height of the ring, and having at its other end means for engaging the other of said pipe flanges, and
    a sleeve adapted to fit over said ring and axially movable in relation to it between a first position in which the segments are held together by the sleeve so as to retain said rod between them and a second position in which the segments are released to free said rod;
    said connector assembly further comprising an annular plate movably mounted around one of said pipes, and having therein an aperture, said sleeve being mounted in said aperture and abutment means on said sleeve for engagement by said plate, and actuating means mounted on the one of said pipes for moving said plate into engagement with said abutment means and thus said sleeve axially with respect to said ring from said first position to said second position.

2. A connector according to claim 1, wherein the serrations on the rod and the ring are screw threads, the ring being a nut into which the threaded rod is screwed.

3. A connector according to claim 2, wherein both the inside wall of the sleeve and the outside wall of at least one of the segments of the nut have at least one groove of semicircular section, and further comprising a cylindrical pin housed in said opposed grooves to enable one to tighten the nut upon the rod by turning the sleeve.

4. A connector according to claim 1, wherein the serrations on the rod and the ring are annular teeth.

5. A connector according to claim 1, wherein the sleeve is force fitted on the annular ring.

6. A connector according to claim 1, wherein the contact surface between the ring and the sleeve is cylindrical.

7. A connector according to claim 1, wherein the ring has an axially stepped outside surface, and said sleeve is correspondingly stepped.

8. A connector according to claim 1, further comprising a second rod engaged in the ring, said rod having an outside surface with serrations thereon corresponding to those of the ring.

9. A connector according to claim 1, wherein said pipe ends have opposed radial flanges, and comprising a plurality of such devices arranged circumferentially around said pipe ends, and wherein the serrated rods of each connecting device are engaged in one of said flanges.

10. A connector for joining together ends of flanged pipes, capable of quickly releasing the pipes even when they are in tension, comprising
    a circumferential flange clamp having opposed ends, and a device for drawing the ends of the clamp together, said device comprising
    a rod affixed to one of said clamp ends, said rod having an outside surface with serrations thereon
    an annular retaining ring assembly comprising plural separate arcuate segments, each having a serrated internal surface corresponding to the serrated surface of said rod, said ring assembly engaged over said serrated surface of said road and bearing against the other of said clamp ends in its installed position, and
    a sleeve adapted to fit over said ring and axially movable in relation to it between a first position in which the segments are held together so as to retain said rod and a second position in which the segments are released to free said rod;
    said connector further comprising actuating means on the other of said clamp ends for moving said sleeve from said first position to said second position.

11. The invention of claim 10, wherein said actuating means comprises a hydraulic cylinder having a casing connected to said sleeve and a piston rod engaged against an end of said rod.

12. A connector assembly for joining together ends of two flanged pipes, capable of quickly releasing the pipes even when they are in tension, comprising two flanged pipes having ends
    at least one connecting device for holding said ends in apposition, said device comprising
    an annular retaining ring having an inside surface provided with serrations, said ring being formed of at least two separate arcuate segments, each having a serrated internal surface thereon, two rods having at one end means having an outside surface with serrations thereon corresponding to those of the ring, and normally engaged thereby over at least a part of the height of the ring, and each having at its other end means for engaging one of said pipes, and a sleeve adapted to fit over said ring and axially movable in relation to it between a first position in which the segments are held together by the sleeve so as to retain said rods between them and a second position in which the segments are released to free said rods;

said connector assembly further comprising an annular plate movably mounted around the other of said pipes, said plate having an aperture therein, said sleeve being retained within said aperture by abutment means mounted on said sleeve, and actuating means mounted between said plate into engagement with said abutment means to thereby move said plate and said other pipe for moving said sleeve axially with respect to said ring from said first position to said second position.

* * * * *